(12) United States Patent
Mahakul et al.

(10) Patent No.: US 6,851,415 B2
(45) Date of Patent: Feb. 8, 2005

(54) SYSTEM FOR EXHAUST/CRANKCASE GAS RECIRCULATION

(75) Inventors: Budhadeb Mahakul, 1509 Canyon Run Rd., Naperville, IL (US) 60565; Randy Paul Hessel, Middleton, WI (US)

(73) Assignee: Budhadeb Mahakul, Naperville, IL (US)

( * ) Notice: Subject to any disclaimer, the term of this patent is extended or adjusted under 35 U.S.C. 154(b) by 38 days.

(21) Appl. No.: 09/905,496

(22) Filed: Jul. 16, 2001

(65) Prior Publication Data

US 2003/0010328 A1 Jan. 16, 2003

(51) Int. Cl.$^7$ .......................... F02M 25/07; F02M 25/06
(52) U.S. Cl. ................... 123/568.17; 123/572
(58) Field of Search ................ 123/568.11, 568.13, 123/568.17, 568.18, 572

(56) References Cited

U.S. PATENT DOCUMENTS

| | | | |
|---|---|---|---|
| 4,094,287 A | | 6/1978 | Nohira |
| 4,119,071 A | * | 10/1978 | Hattori ................. 123/568.17 |
| 4,422,430 A | * | 12/1983 | Wiatrak ................. 123/568.13 |
| 4,672,939 A | | 6/1987 | Yokoi |
| 4,854,291 A | * | 8/1989 | Elsbett et al. ........... 123/568.13 |
| 5,056,309 A | * | 10/1991 | Linder et al. ........... 123/568.17 |
| 5,121,734 A | * | 6/1992 | Grieshaber et al. .... 123/568.17 |
| 5,261,373 A | * | 11/1993 | Ohsuga et al. ......... 123/568.17 |
| 5,307,784 A | * | 5/1994 | Choma et al. ............... 123/572 |
| 5,322,043 A | * | 6/1994 | Shriner et al. ......... 123/568.17 |
| 5,611,203 A | | 3/1997 | Henderson |
| 5,802,846 A | | 9/1998 | Bailey |
| 5,979,421 A | | 11/1999 | Yamashita |
| 6,003,315 A | | 12/1999 | Bailey |
| 6,044,827 A | | 4/2000 | Pfaff |

* cited by examiner

Primary Examiner—Willis R. Wolfe

(57) ABSTRACT

An exhaust gas recirculation system for an internal combustion engine by which a portion of exhaust gas from the engine is recirculated from an exhaust line of the engine into an intake line of the engine, introducing the exhaust gas flow into the intake port around the intake valve seat region. The present invention provides a unique means of introducing EGR/Crankcase gas into the combustion chamber of an engine. The location for introducing EGR/Crankacse gas is above the intake valve seat region. The system does not require any pumping arrangement either through the use of external pumps or by raising the exhaust back presssure in the system. This system does not penalize airflow into the system as the flow passage does not require reduction in size to the air passage. Introducing the EGR just during the air induction process means the quantity of exhaust gas in the system is minimal. This results in improved transient response. Use of minimal EGR also results in smaller EGR cooling system. The introduction of crankcase into the combustion chamber results in lowering of the particulates in the exhuast. The oil particles in the crankcase gas also improves intake valve life.

9 Claims, 5 Drawing Sheets

System for exhaust/crancase gas re-circulation

Diagram of an EGR System

System for exhaust/crancase gas re-circulation

System for exhaust/crancase gas re-circulation

Diagram of an Crankcase Ventilation System

SYSTEM FOR EXHAUST/CRANKCASE GAS RECIRCULATION

BACKGROUND

1. Field of Invention

This invention relates to exhaust gas recirculation (EGR) or crankcase blowby gas recirculation system into an internal combustion engine. More specifically this invention relates to an exhaust gas recirculation system or crankcase blowby system to reduce NOx emission and Hydrocarbon/Particulate emission.

2. Description of Prior Art

With continued tightening of the emission standards for internal combustion engines, particularly NOx, not only has the need to recirculate exhaust gases back into the engine become important, but also has the need to improve EGR technology. The crankcase ventilation gases emit significant amount of particulate and hydrocarbon into the exhaust. Therefore, a means to develop a system to recirculate crankcase gas back into the engine intake system becomes important.

Significant efforts in research and development have been undertaken to re-circulate exhaust gas into the engine. The reason for introducing EGR (exhaust gas re-circulation) in internal combustion engines, is to reduce NOx emission without incurring fuel consumption penalty. The difficulty in introducing EGR in internal combustion engines is that it requires a pumping arrangement or a venturi arrangement. This adds complexity and penalty in fuel consumption. In addition, filling up the air intake system with EGR often leads to poor transient response performance for an internal combustion engine. A similar problem exists for crankcase breathing arrangements for internal combustion engines. The crankcase gases may not be vented to the atmosphere per various Emissions regulations. This leaves the crankcase gas to be vented either to the exhaust stream or be introduced ahead of the compressor inlet in a turbocharged engine arrangement. Venting crankcase gas into the exhaust causes an increase in Particulate matter and Hydrocarbon emission. Also introducing the crankcase gases ahead of the turbocharger causes significant issues with fouling of the compressor and aftercoolers. Introducing the crankcase gas into the air intake system will result in combustion of the crankcase gas in the cylinder. This results in lowering of particulate and hydrocarbon emission.

In general, the exhaust gas pressures in the exhaust manifold for an internal combustion engine are lower than the pressures in the air intake manifold. This provides positive breathing and increased pumping work which results in improved fuel economy.

To deliver EGR to the air intake system, higher exhaust gas pressure is needed, for a system without any pump. Often the turbocharger is resized to obtain higher exhaust gas pressure. This results in loss of fuel economy.

U.S. Pat. No. 5,611,203 to Henderson et al (1997) discloses that creating a venturi in the Intake runner pipe will allow exhaust gas to be drawn. This system will provide EGR supply at higher when there is a sufficient flow of air to create a venturi. However at part load the supply of EGR is limited. To overcome this problem some designs have used a smaller bypass pipe in parallel with valve arrangements. At light load the main air passage is closed and air is diverted through the smaller pipe. This system requires throttling of the Intake runners and complicated valve arrangement for part load EGR delivery. Throttling of the Intake air results in fuel consumption loss and potential for increase in particulate.

Another U.S. Pat. No. 6,044,827 to Pfaffet al (2000) describes a complex exhaust gas recirculation arrangent having valves and ejector placed in the air inlet duct. The supply of exhaust gas to the system will require higher exhaust pressure or a pumping arrangement. Both these features will result in fuel consumption loss and in a complicated system.

SUMMARY OF THE INVENTION

In view of the foregoing, it is a primary object of the present invention to provide an exhaust gas recirculation (EGR) or a crankcase ventilation system in which the opening of the intake valves and the induction stroke will cause the exhaust gas or crankcase gas to be introduced into the engine under all conditions.

In keeping with the foregoing object, it is an associated object of the present invention to enable EGR or crankcase ventilation gas to be effectively utilized on an internal combustion engine having or not having a supercharger or a turbocharger.

It is a more specific object of the present invention to achieve the above objects through the use of an improved construction for a means of connecting exhaust gas/crankcase gas into the engine intake system located in close proximity of the intake valve seats.

Another specific object of the present invention to achieve the above objects by providing a means for introducing low pressure exhaust gas or crankcase ventilation gas into the engine intake system.

These and other object are achieved by preferred embodiments of the present invention.

The present invention defines a unique exhaust gas recirculation(EGR)/Crankcase gas recirculation arrangement. EGR/Crankcase gas is admitted into the engine with modifications in the cylinder head air inlet ports. Air flows into the cylinder as the intake valves open. The air induction stroke results in high velocity of the Intake air around the valve seat region due to the pressure gradient between the ports and the cylinder (FIG. 1). This increase in velocity leads to a region of low pressure. Introducing the exhaust gas from the exhaust manifold directly into the valve seat region will cause the exhaust to be drawn into the cylinder (FIG. 2). This arrangement may be utilized for drawing in crankcase ventilation gas also. A simulation was performed with a Computational fluid dynamics package to confirm this claim. The results of the simulation show the pressure distribution around the valve seat area of the inlet port (FIG. 1). It is clearly shown that the pressure in the valve seat region is significantly lower than the air supply pressure to the ports. For this case, the simulation started just prior to intake valve opening. At that crank angle, pressures and temperatures throughout the flow domain were uniform. Pressures and temperatures at the port ends were also equal. The figures show the pressure field at 80 degrees after-top-dead-center. This crank angle was chosen because the piston is moving fast then, resulting in large velocities in the valve curtain region, which give the lower pressures seen in the figure. At light load engine operation when the boost pressure is significantly low, the air induction process in the cylinder will draw in the exhaust gas into the cylinder. This system will ensure that EGR is supplied into the engine cylinder under all operating conditions. A pumping arrangement may be utilized to further enahnce the quatities of EGR/crankcase gas into the air intake port of an internal combustion engine. An actuator that will control the amount of flow into the cylinder shall provide the control of the exhaust into the cylinder. The actuator may be operated by a mechanical/hydraulic/pneumatic/electrical system. A simple design is shown in FIG. 3, which comprises of a pipe from the exhaust that is fed into a cooler. The amount of exhaust gas flow into the cylinder is controlled by the actuator that feeds into the individual cylinders. The exhaust gas flows into the cylinder only when the intake valves are open. The ability to supply exhaust gas, during the intake process, will result in minimal exhaust gas present in the intake port. This significantly improves transient response compared to other systems. Also due to the small quantities of exhaust gas being circulated in the system, the amount of exhaust gas cooling required will be minimal. The arrangement for crankcase gas is shown in FIG. 4. The crankcase gas is directly fed into the intake valve seat region as shown. The ability to introduce the crankcase gas back into the cylinder will result in significant reduction in particulate without causing any deterioration to engine performance.

These and further objects, features and advantages of the present invention will become apparent from the following description when taken in connection with the accompanying drawings which, for purposes of illustration only, show several embodiments in accordance with the present invention.

DESCRIPTION OF THE PREFERRED EMBODIMENTS

Figure 3:
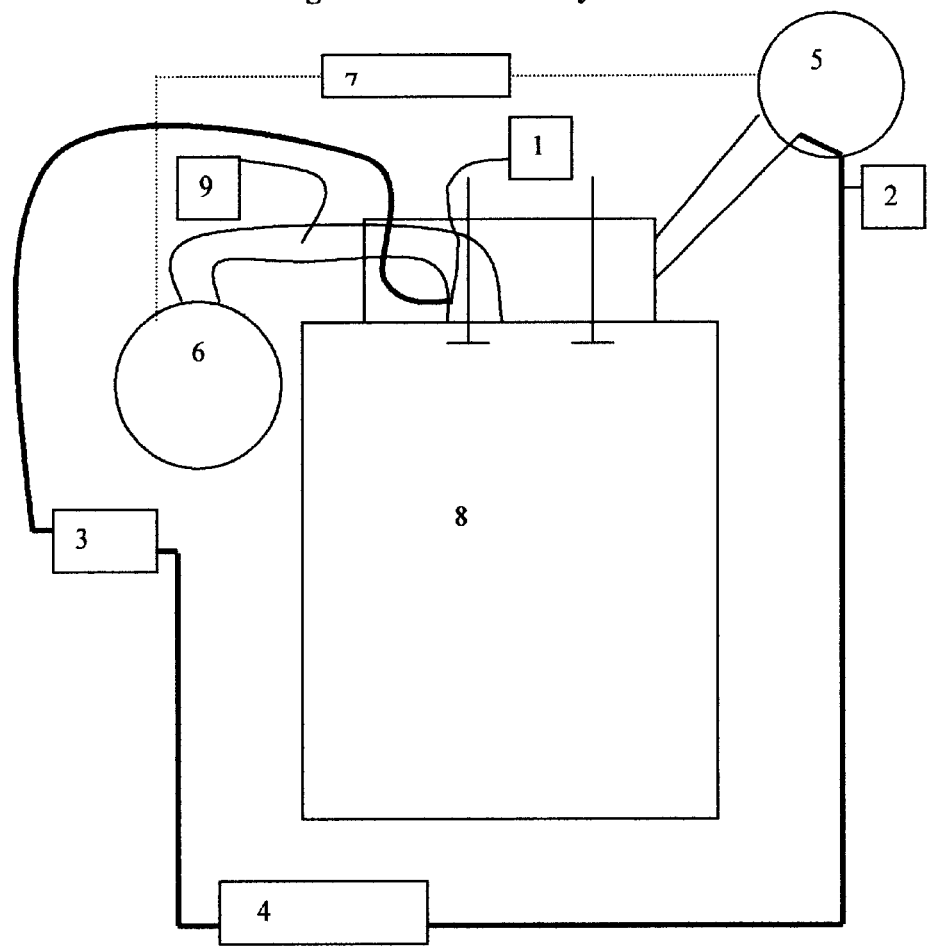
FIG. 3 A schematic depiction of an EGR system in accordance with present invention.

The present invention will be described hereinafter with reference to the preferred embodiments thereof in conjunction with the accompanying drawings. First referring to FIG. 3, indicated at 8 is an internal combustion engine; 9, an intake port and 5 and exhaust manifold. The intake port 9 and exhaust manifold 5 are connected to each other by means by means of a recirculation pipe 2, EGR cooler 4 and exhaust gas control valve 3. To introduce EGR into the system, exhaust gas is drawn from the system before the turbocharger 5 and led through the pipe 2 into an EGR cooler 4. From there the exhaust gas is fed through the control valve 3, which regulates the quantity of EGR into the intake port/s location 1.

Figure 4:
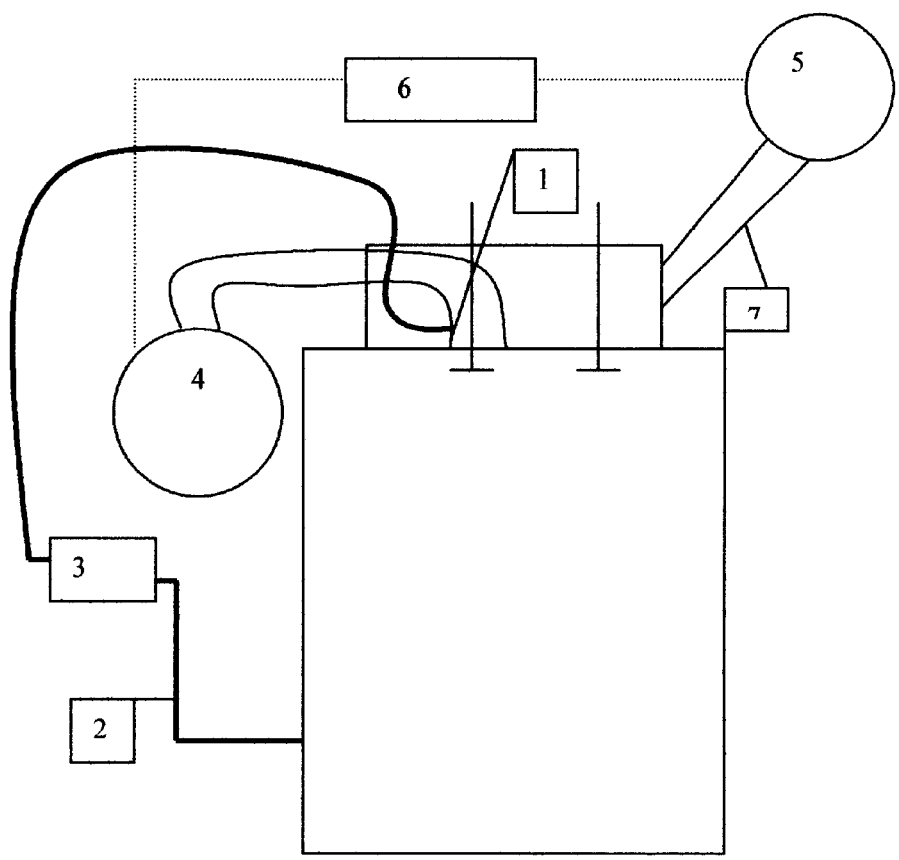
FIG. 4 A schematic drawing of a Crankcase ventilation system in accordance with present invention.

The operation of the crankcase gas arrangement is shown in FIG. 4. Blowby gas 2 from the crankcase is directed into the oil separator 3. From there the crankcase gas is led to the intake port location 1 above the valve seat area. This will ensure a positive flow of crankcase into the engine. The ability to reintroduce the crankcase gas into the system results in lower particulate emission as the oil particles in the crankcase gas are burnt in the cylinder. Also the oil mist in the gas enhances the life of the intake valve seat.

Figure 1:
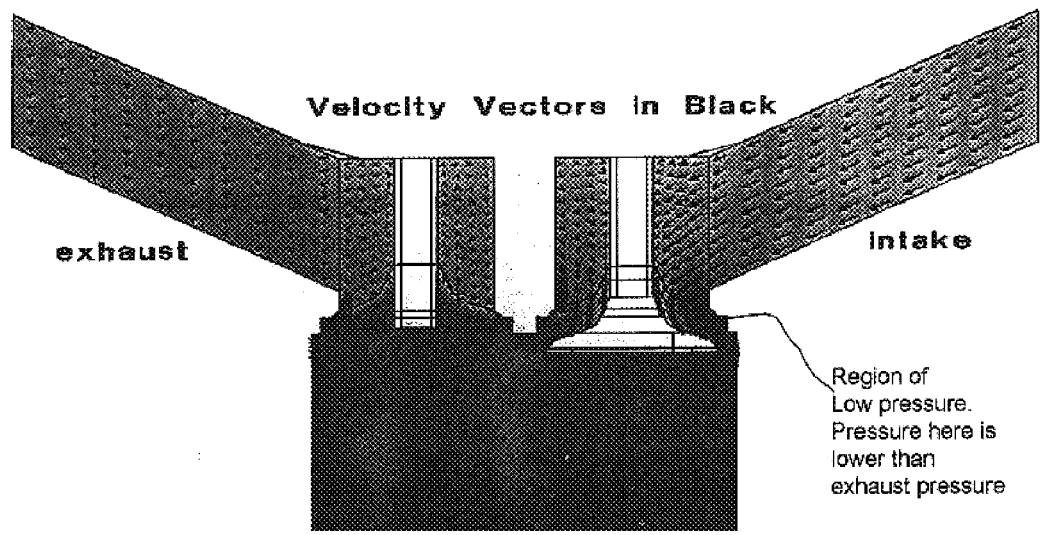
FIG. 1 Simulation results from Computational fluid dynamics showing velocity vectors and pressure distribution in the intake manifold and cylinder.
Figure 2:
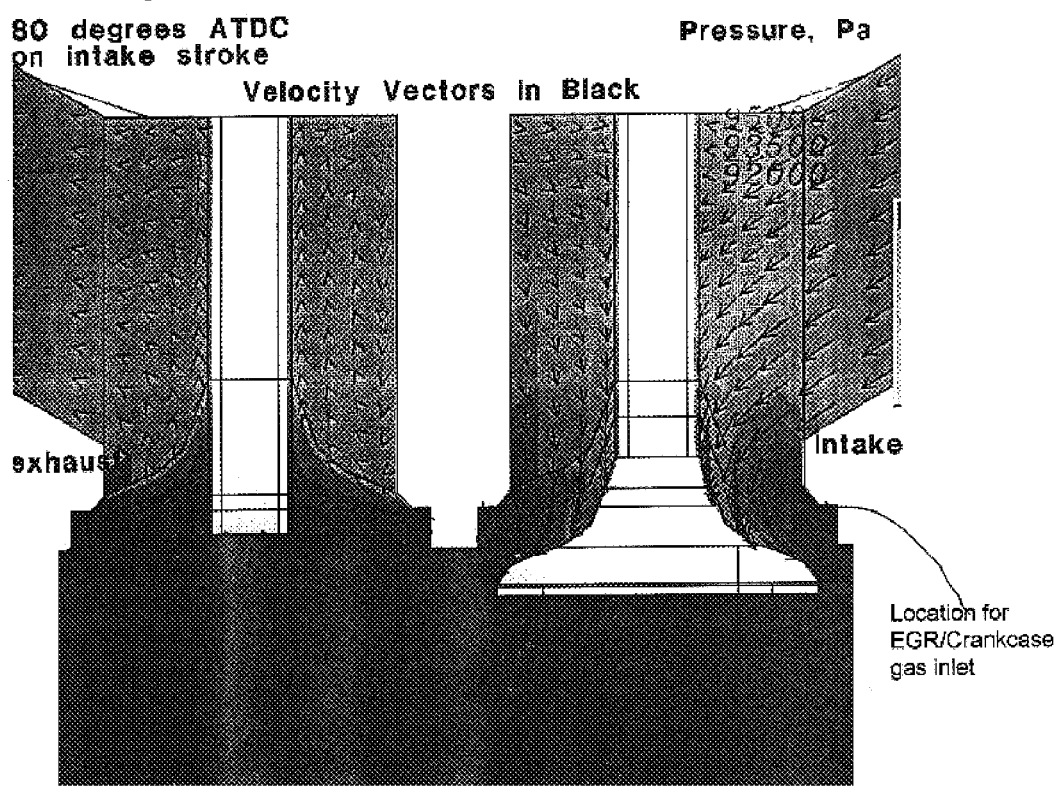
FIG. 2 Simulation results from Computational fluid dynamics showing exploded view of FIG. 1 in the intake valve region. Also shown is the location of EGR/Crankcase gas inlet line.

FIG. 1 shows the simulation results from a turbocharged engine outlining the velocity vectors and pressure distribution around the intake valve seat region resulting from air induction stroke and opening of the intake valve. This increase in velocity leads to a region of low pressure around the valve seat region. Introducing the exhaust gas from the exhaust manifold directly into this valve seat region will cause the exhaust to be drawn into the intake port. FIG. 2 shows an exploded view of the pressure distribution along the valve seat region.

Figure 5:
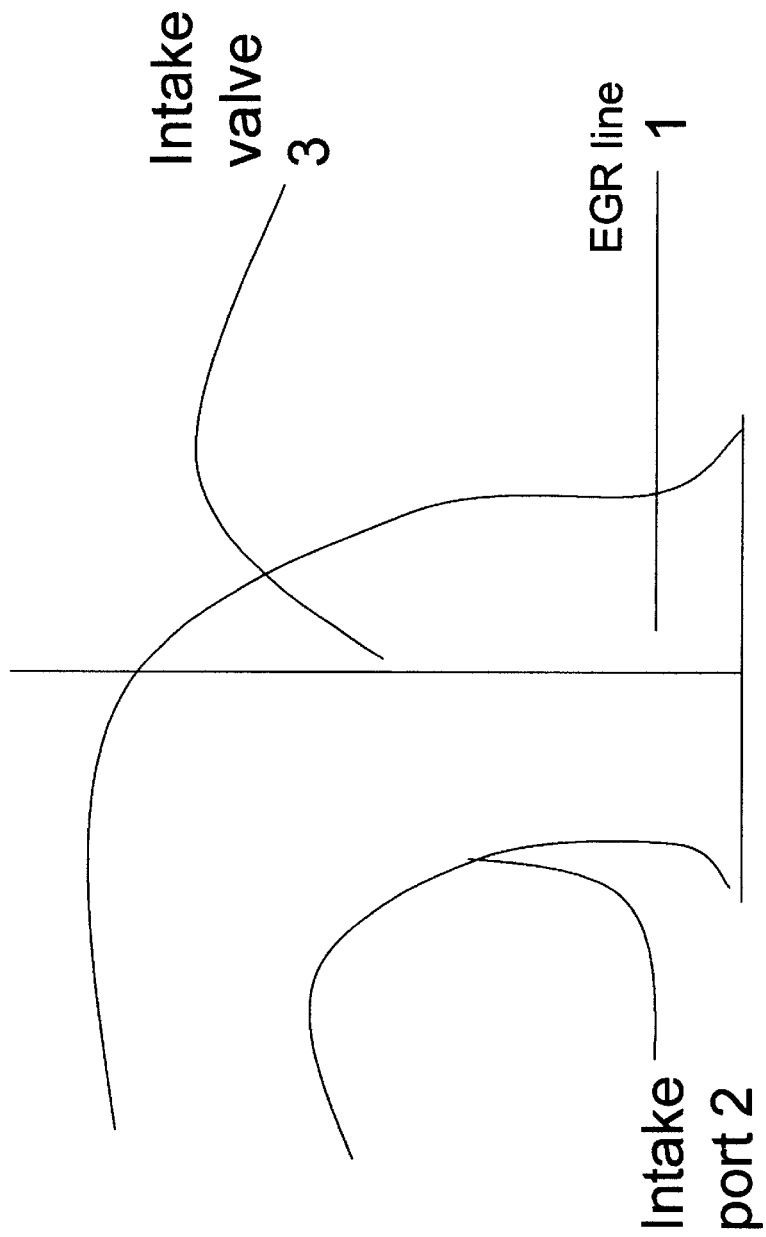
FIG. 5 A schematic drawing showing an arrangement of EGR/Crankcase gas introduction line into the intake port in the vicinity of the intake valve.

Further improvements in creating a low pressure region around the valve seat has been shown in FIG. 5. Extending the EGR line 1 in the air intake port 2 in close vicinity of the valve 3 increases the amount of exhaust gas that can be drawn into the engine.

While various embodiments in accordance with the present invention have been shown as described, it is understood that the invention is not limited thereto, and is susceptible to numerous changes and modifications as known to those skilled in the art. Therefore, this invention is not limited to the details shown and described herein, and includes all such and modifications as are encompassed by the scope of the appended claims.

The present invention will find applicability for use on a wide range of engine types for purposes of meeting stringent emission regulations, particularly those applicable tubo-equipped diesel engine.

We claim:

1. A crankcase blowby gas recirculation system for an internal combustion engine by which the crankcase blowby gas from the engine is recirculated from the blowby line of the engine into the intake line of the engine, a pressure differential means for drawing a secondary flow from said crankcase blowby line into a primary flow in the said intake line, and the actuation of the intake valves and induction stroke of the engine, said blowby line discharge disposed in said recirculation line.

2. An exhaust gas recirculation system for an internal combustion engine by which a portion of exhaust gases produced by the engine is recirculated, said arrangement comprising: an air intake line supplying air into the engine through intake valves, an exhaust gas recirculation pipe extending into the said air intake duct, a pressure differential means for drawing a secondary flow from said recirculation line into a primary flow in the said intake line, and the actuation of the intake valves and induction stroke of the engine, a high pressure exhaust line discharge disposed in said recirculation line at said pressure different.

3. An exhaust gas recirculation system according to claim 2, wherein the exhaust pressure is lower than the intake line pressure, said exhaust is drawn into the intake line at the low pressure region above the valve seat.

4. An exhaust gas recirculation system according to claim 2, wherein a source of high velocity air is a compressor of an engine driven supercharger and having at least one turbine, said exhaust line being connected to said at least one turbine downstream of said exhaust gas line and said exhaust gas recirculation line being connected to the intake line downstream of said compressor.

5. An exhaust gas recirculation system according to claim 2, wherein a source of high velocity air is the air induction arrangement of a naturally aspirated engine, having exhaust line, said exhaust line being connected to said EGR line, and said EGR line being connected to the intake line upstream of the intake valves.

6. An exhaust gas recirculation system according to claim 2 wherein said exhaust gas recirculation line extends into the air intake line in close proximity of the valve stems above the seat region to introduce exhaust gas into the intake duct, said exhaust gas pressure is higher than said intake duct pressure at the EGR discharge line.

7. An exhaust gas recirculation system according to claim 2, wherein said pressure differential means comprises high velocity air upstream of intake valve region, resulting from actuation of intake valves and induction stroke of the engine.

8. A location for connection of EGR gas in the air intake duct according to claim 7 at a region of low pressure in the intake duct in the close vicinity of the intake valve seat, said low pressure region permits EGR into the intake duct.

9. An exhaust gas recirculation system according to claim 7, wherein said source of high velocity air is a compressor of an exhaust gas powered turbocharger having at least one turbine, said exhaust line being connected to said at least one turbine downstream of said EGR line, and said EGR line being connected to the intake line, downstream of the said compressor.

* * * * *